(12) United States Patent
Sebire et al.

(10) Patent No.: US 11,395,177 B2
(45) Date of Patent: Jul. 19, 2022

(54) SEQUENCE NUMBERING ON DEMAND FOR SEGMENTATION

(71) Applicant: Nokia Technologies Oy, Espoo (FI)

(72) Inventors: Benoist Sebire, Tokyo (JP); Samuli Turtinen, Ii (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/479,968

(22) PCT Filed: Jan. 18, 2018

(86) PCT No.: PCT/FI2018/050035
§ 371 (c)(1),
(2) Date: Jul. 23, 2019

(87) PCT Pub. No.: WO2018/138410
PCT Pub. Date: Aug. 2, 2018

(65) Prior Publication Data
US 2020/0015118 A1    Jan. 9, 2020

Related U.S. Application Data

(60) Provisional application No. 62/449,771, filed on Jan. 24, 2017.

(51) Int. Cl.
*H04W 28/04* (2009.01)
*H04W 80/02* (2009.01)

(52) U.S. Cl.
CPC ............ *H04W 28/04* (2013.01); *H04W 80/02* (2013.01)

(58) Field of Classification Search
CPC .............................. H04W 28/04; H04W 80/02

USPC ........................................................ 370/216
See application file for complete search history.

(56) References Cited

U.S. PATENT DOCUMENTS

| 8,085,753 | B2 | 12/2011 | Wu |
| 8,614,948 | B2 | 12/2013 | Yang |
| 2003/0210676 | A1 | 11/2003 | Wu |
| 2007/0029178 | A1 | 2/2007 | Mukharzi et al. |
| 2009/0086659 | A1* | 4/2009 | Pani ........................ H04L 69/10 370/310 |

(Continued)

FOREIGN PATENT DOCUMENTS

| EP | 1 868 311 A1 | 12/2007 |
| WO | 2002/015524 A1 | 2/2002 |
| WO | 2018/082760 A1 | 5/2018 |

OTHER PUBLICATIONS

"PDCP and RLC SNs", 3GPP TSG-RAN2 NR Ad Hoc Spokane, Washington, USA, Jan. 17-19, 2017, R2-1700080 (Year: 2017).*

(Continued)

*Primary Examiner* — Yemane Mesfin
*Assistant Examiner* — Intekhaab A Siddiquee
(74) *Attorney, Agent, or Firm* — Harrington & Smith

(57) ABSTRACT

Various communication systems may benefit from the appropriate use of sequence numbers. For example, radio link control unacknowledged mode may benefit from the use of sequence numbers on demand for segmentation. A method can include determining whether segmentation is to occur with respect to a packet data unit. The method can include providing a sequence number in a header of the packet data unit contingent on usage of segmentation with respect to the packet data unit.

19 Claims, 7 Drawing Sheets

(56) References Cited

U.S. PATENT DOCUMENTS

2012/0230256 A1* 9/2012 Torsner ............... H04L 1/0015
                                                    370/328
2013/0070682 A1* 3/2013 Kim ..................... H04L 5/001
                                                    370/328
2013/0148672 A1  6/2013 Cheng
2016/0295458 A1 10/2016 Charpentier et al.

OTHER PUBLICATIONS

Extended European Search Report received for corresponding European Patent Application No. 18744277.7, dated May 15, 2020, 8 pages.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)", 3GPP TS 36.300, V14.1.0, Dec. 2016, pp. 1-317.
"New SID Proposal: Study on New Radio Access Technology", 3GPP TSG-RAN meeting #71, RP-160671, Agenda 9.1, NTT DOCOMO, Mar. 7-10, 2016, 8 pages.
"3rd Generation Partnership Project; Technical Specification Group Radio Access Network; Study on New Radio Access Technology; Radio Interface Protocol Aspects (Release 14)", 3GPP TR 38.804, V0.4.0, Nov. 2016, 31 pages.
"On usage of PDCP SN at RLC for NR", 3GPP TSG-RAN WG2, Meeting#96, R2-167662, Agenda: 9.2.1.1, Nokia, Nov. 14-18, 2016, 2 pages.
"NR UP—Single or Double SN ?", 3GPP TSG-RAN WG2, Meeting#96bis, R2-1700031, Agenda: 3.2.1.1, Samsung, Jan. 17-19, 2017, 4 pages.
"3rd Generation Partnership Project; Technical Specification Group Radio Access Network; Evolved Universal Terrestrial Radio Access (E-UTRA); Radio Link Control (RLC) protocol specification (Release 13)", 3GPP TS 36.322, V13.2.0, Jun. 2016, pp. 1-45.
International Search Report and Written Opinion received for corresponding Patent Cooperation Treaty Application No. PCT/FI2018/050035, dated May 11, 2018, 13 pages.
"PDCP and RLC SNs", 3GPP TSG-RAN2 NR Ad Hoc, R2-1700080, Agenda: 3.2.1.1, Huawei, Jan. 17-19, 2017, 4 pages.

* cited by examiner

SEQUENCE NUMBERING ON DEMAND FOR SEGMENTATION

RELATED APPLICATION

This application was originally filed as PCT Application No. PCT/FI2018/050035, filed on 18 Jan. 2018, which claims priority from U.S. Provisional Application No. 62/449,771, filed on 24 Jan. 2017.

CROSS-REFERENCE TO RELATED APPLICATION

This application is related to and claims the benefit and priority of U.S. Provisional Patent Application No. 62/449,771, filed Jan. 24, 2017, the entirety of which is hereby incorporated herein by reference.

BACKGROUND

Field

Various communication systems may benefit from the appropriate use of sequence numbers. For example, radio link control unacknowledged mode may benefit from the use of sequence numbers on demand for segmentation.

Description of the Related Art

The radio protocols for the user plane traditionally include three layers: packet data convergence protocol (PDCP), radio link control (RLC), and medium access control (MAC). The main services and functions of the PDCP sublayer include: header compression and decompression, transfer of user data and ciphering & deciphering as well as timer-based service data unit (SDU) discard. When dual connectivity is configured, PDCP also performs reordering. These functions rely on a PDCP sequence number (SN) in the PDCP header of every PDCP packet data unit (PDU). FIG. 1 illustrates a PDCP PDU structure. As shown in FIG. 1, a PDCP PDU includes a header and an SDU.

Below PDCP lies the RLC sublayer whose main services and functions include the following: transfer of upper layer PDUs; error correction through automatic repeat request (ARQ) only for acknowledged mode (AM) data transfer; concatenation, segmentation, and reassembly of RLC SDUs only for unacknowledged mode (UM) and AM data transfer; re-segmentation of RLC data PDUs only for AM data transfer; reordering of RLC data PDUs only for UM and AM data transfer; duplicate detection only for UM and AM data transfer; and protocol error detection only for AM data transfer. These functions also rely on an RLC SN in the RLC header of every RLC PDU.

FIG. 2 illustrates RLC PDU structure. As shown in FIG. 2, each RLC PDU can include a header, with the remainder of the RLC PDU being a body. The body of the RLC PDU can include part or all of one or more RLC SDU, as shown.

Finally, below the RLC sublayer lies the MAC sublayer, whose main services and functions include the following: mapping between logical channels and transport channels; multiplexing/demultiplexing of MAC SDUs belonging to one or different logical channels into/from transport blocks (TB) delivered to/from the physical layer on transport channels; scheduling information reporting; error correction through hybrid ARQ (HARQ); priority handling between logical channels of one UE; priority handling between user equipment (UEs) by means of dynamic scheduling; transport format selection; and padding.

SUMMARY

According to a first embodiment, a method can include determining whether segmentation is to occur with respect to a packet data unit. The method can include providing a sequence number in a header of the packet data unit contingent on usage of segmentation with respect to the packet data unit.

In a variant, the packet data unit can be a radio link control packet data unit.

In a variant, the sequence number may be provided when the packet data unit is a first packet data unit and the sequence number may not be provided when the packet data unit is a last packet data unit.

In a variant, the sequence number may be provided when segmentation is not used with respect to the packet data unit.

In a variant, the sequence number may be provided only when segmentation is used with respect to the packet data unit.

In a variant, the sequence number used at a radio link control sublayer may be at least one of a reused packet data convergence protocol sequence number or a separate radio link control sequence number.

In a variant, the method can further include transmitting the packet data unit in unacknowledged mode.

In a variant, the method can further include a segmentation flag in a header of the packet data unit indicating whether a segmentation is used for the packet data unit at the radio link control sublayer and indicating that the sequence number is present.

According to a second embodiment, a method can include determining whether segmentation is used for a packet data unit. The method can also include identifying usage of sequence numbers with respect to the packet data unit contingent on the determination of whether segmentation is used.

In a variant, the packet data unit can be a radio link control packet data unit.

In a variant, the sequence number may be provided when the packet data unit is a first packet data unit and the sequence number may not be provided when the packet data unit is a last packet data unit.

In a variant, the sequence number may be provided when segmentation is not used with respect to the packet data unit.

In a variant, the sequence number may be provided only when segmentation is used with respect to the packet data unit.

In a variant, the sequence number used at a radio link control sublayer may be at least one of a reused packet data convergence protocol sequence number or a separate radio link control sequence number.

In a variant, the method can further include receiving the packet data unit as transmitted in unacknowledged mode.

In a variant, the method can further include determining whether a sequence number field is present based on a segmentation flag in a header of the packet data unit.

According to third and fourth embodiments, an apparatus can include means for performing the method according to the first and second embodiments respectively, in any of their variants.

According to fifth and sixth embodiments, an apparatus can include at least one processor and at least one memory including computer program code. The at least one memory and the computer program code can be configured to, with the at least one processor, cause the apparatus at least to perform the method according to the first and second embodiments respectively, in any of their variants.

According to seventh and eighth embodiments, a computer program product may encode instructions for performing a process including the method according to the first and second embodiments respectively, in any of their variants.

According to ninth and tenth embodiments, a non-transitory computer readable medium may encode instructions that, when executed in hardware, perform a process including the method according to the first and second embodiments respectively, in any of their variants.

According to eleventh and twelfth embodiments, a system may include at least one apparatus according to the third or fifth embodiments in communication with at least one apparatus according to the fourth or sixth embodiments, respectively in any of their variants.

BRIEF DESCRIPTION OF THE DRAWINGS

For proper understanding of the invention, reference should be made to the accompanying drawings, wherein.

DETAILED DESCRIPTION

Figure 1:
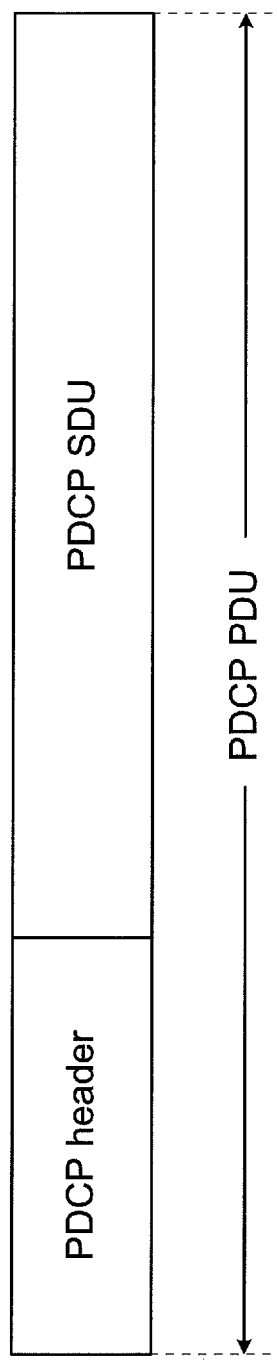
FIG. 1 illustrates a PDCP PDU structure.
Figure 2:
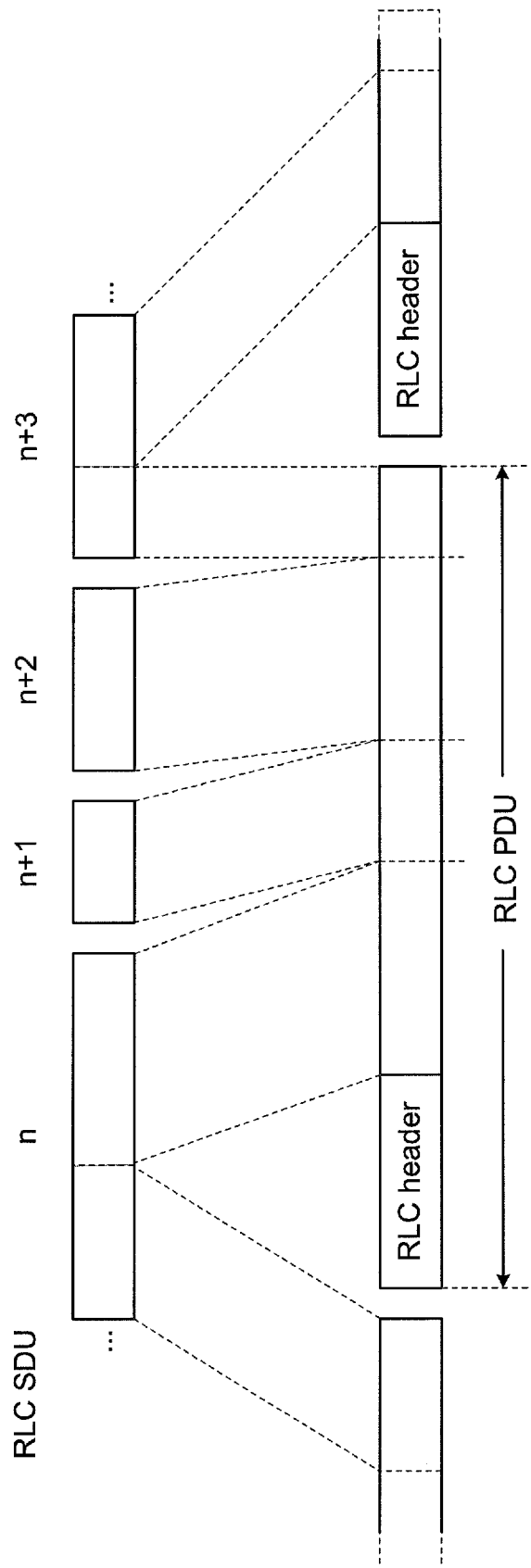
FIG. 2 illustrates RLC PDU structure.

New radio (NR) can refer to a new radio access technology (RAT) that aims to support very high bit rates required for fifth generation (5G) communication systems. In order to support such bit rates, concatenation may be moved to the MAC sublayer and reordering may be moved to the PDCP sublayer. Thus, the RLC sublayer may have the main functions of error correction, for example through Automatic Repeat Request (ARQ) protocol, and segmentation/re-assembly.

It is possible that, in NR, the RLC sublayer may re-use a PDCP SN or may have a separate RLC SN. Without performing concatenation, the separate RLC SN may bring unnecessary overhead to the system as multiple RLC PDUs may be transmitted within one MAC PDU. However, without having to perform reordering in RLC, the only purpose of an SN for RLC UM (Un-Acknowledge Mode) may be to support segmentation as it does not support error correction function. In other words, whenever segmentation does not occur, the RLC SN may serve no purpose for RLC UM operation.

Additionally, segment offset (SO)-based segmentation may be supported in NR for segmentation and re-segmentation. With this, the same SN may be assigned/used for every segment of a single RLC SDU and an SO-field can be used to point to the position of the original SDU at which the segment begins. However, similarly to long term evolution (LTE), the RLC SN could also be used to reassemble RLC SDU from multiple segments, that is, the consecutive segments may have consecutive RLC SNs, which can be referred to as SN-based segmentation.

In certain embodiments, for RLC UM, an SN is only added when segmentation takes place. The RLC-UM SN can have the following characteristics: the PDCP SN can be reused or a separate SN can be introduced by the RLC sublayer; with SO-based segmentation, the SN may not need to be continuous between segments of different RLC SDUs though it is still advantageous that the same SN is reused as seldom as possible; with SN-based segmentation, the SNs for segments of a single RLC SDU may need to be continuous, however, they may not need to be continuous between segments of different RLC SDUs; and the number of bits may determine how many RLC PDUs can be segmented on the fly. For instance, with two bits SN, RLC-UM may only be able to handle the segmentation of four RLC PDUs simultaneously. It may however be noted that such an RLC-UM may transfer, in between segments of such four segmented RLC PDUs simultaneously in transfer, any number of unsegmented PDUs. For this reason, the number of bits used for the SN may be substantially lower than that of an SN in a traditional RLC, where the SN limits the maximum number of any PDUs in transfer.

The receiving RLC UM entity may determine the existence of the SN field based on the presence of any segmentation flag(s) in the RLC PDU header or any other flag defined for the purpose of segmentation. In one example, the transmitter may determine more segments are being transmitted than the SN length can handle simultaneously, in which case, the flag may also determine the used SN length in the header. Such a flag would then consume several bits and tell the receiver how many bits are used to signal the SN.

In an alternative/additional option, the RLC SN (#X) may always be present for the first RLC PDU and not present for the last RLC PDU in the MAC PDU for a given logical channel, regardless of whether the RLC PDUs were segmented or not, such as the first or last one. If the last RLC PDU was segmented, the RLC SN assumed for it can be RLC SN #X+1. In one example, if SO-based segmentation was used for the last RLC PDU with RLC SN #X+1, the next created MAC PDU may contain first RLC PDU (segment) with RLC SN #X+1. In one example, if SN-based segmentation was used for the last RLC PDU with RLC SN #X+1, the next created MAC PDU may contain first RLC PDU (segment) with RLC SN #X+2.

This alternative may maximize preprocessing capabilities in the transmitting RLC UM entity, as the SN for the last RLC PDU may not need to be generated on the fly, whether or not the RLC PDU gets segmented, because there may be a direct relation to the SN for the first RLC PDU, namely the next SN value.

The use of the above approach may also have other effects. For example, the above approach may enable fully deterministic RLC PDU header sizes before the grant is received. Moreover, in certain embodiment segments of different PDUs can be identified and re-assembly can take place while minimizing overhead.

Figure 3:
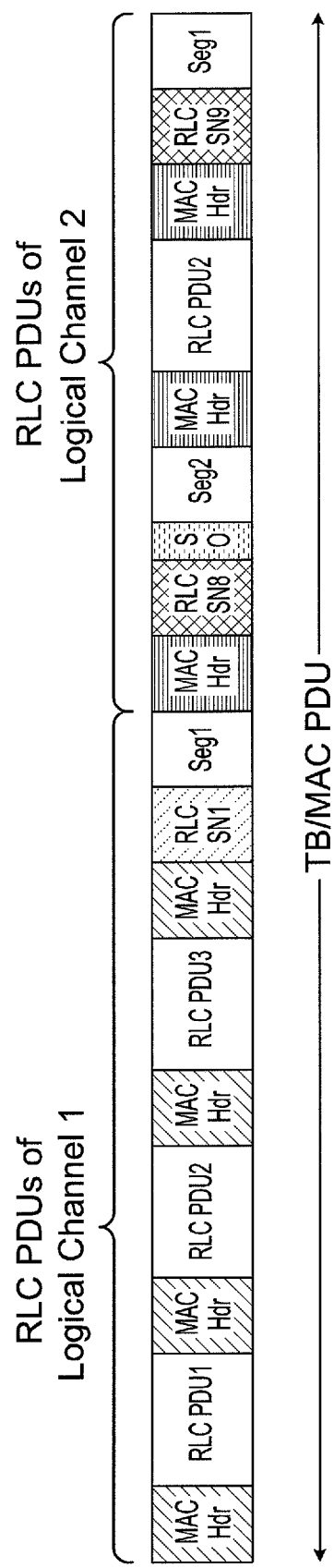
FIG. 3 illustrates MAC and RLC PDU structures according to certain embodiments.

FIG. 3 illustrates MAC and RLC PDU structures according to certain embodiments. Thus, FIG. 3 provides an example illustration, while numerous other structures are also permitted. In FIG. 3, two separate logical channels are presented and multiplexed within one MAC PDU by a MAC transmitter.

For logical channel 1 (LCH1), RLC PDU1, PDU2, and PDU3 are not segmented by the RLC transmitter. Thus, no RLC SN is associated with these RLC PDUs. However, RLC PDU4 is segmented and thus associated with RLC SN1. For LCH2, RLC PDU1 and PDU3 are segmented and include RLC SNs (SN8 and SN9 respectively). RLC PDU2 is not segmented and does not include SN field. The rest of the RLC header, which is not illustrated, could include, for example, the segmentation information.

Figure 4:
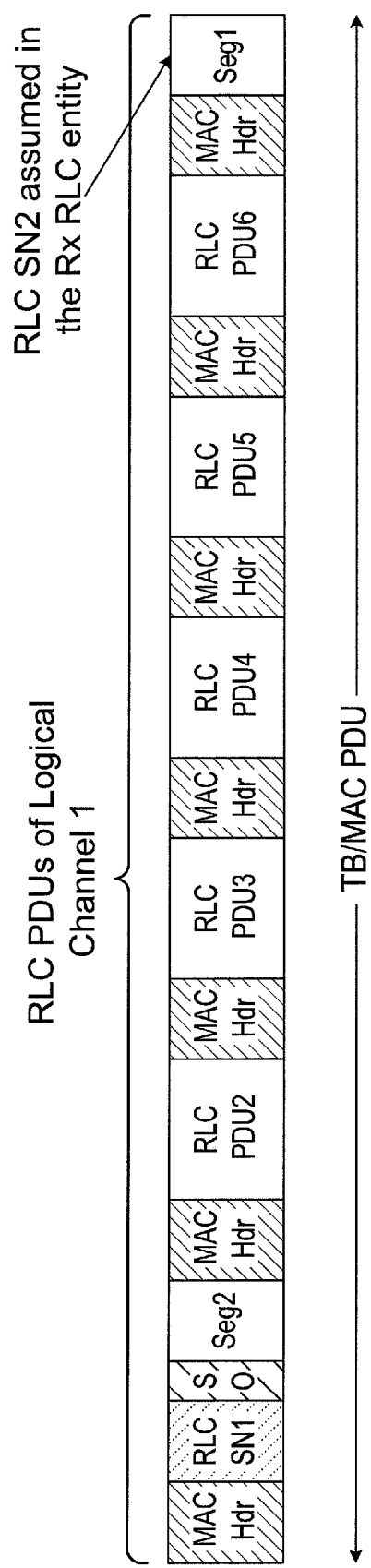
FIG. 4 illustrates additional MAC and RLC PDU structures according to certain embodiments.

As mentioned above, an alternative proposal may permit full pre-processing in the transmitter with potentially slightly more overhead if the first RLC PDU is not segmented or less overhead if the first and last RLC PDU is segmented frequently. FIG. 4 provides an example illustration of the alternative/additional option mentioned above. Thus, FIG. 4 illustrates additional MAC and RLC PDU structures according to certain embodiments.

In FIG. 4, the first RLC PDU1 is segmented in the previous MAC PDU and thus the rest of the PDU (Seg2) is conveyed in this MAC PDU and associated with RLC SN1. RLC PDU2 through RLC PDU6 do not include RLC SN as they are full PDUs. Furthermore, RLC PDU7 also does not include RLC SN as it can be determined to be RLC SN2 from the RLC SN1 that was associated with RLC PDU1.

RLC PDU1 may include the RLC SN whether or not it was segmented, according to certain embodiments. In this example, it was also a segmented RLC PDU. If the last RLC PDU7 was not segmented, the Rx does not need to assume any RLC SN for it.

Figure 5:
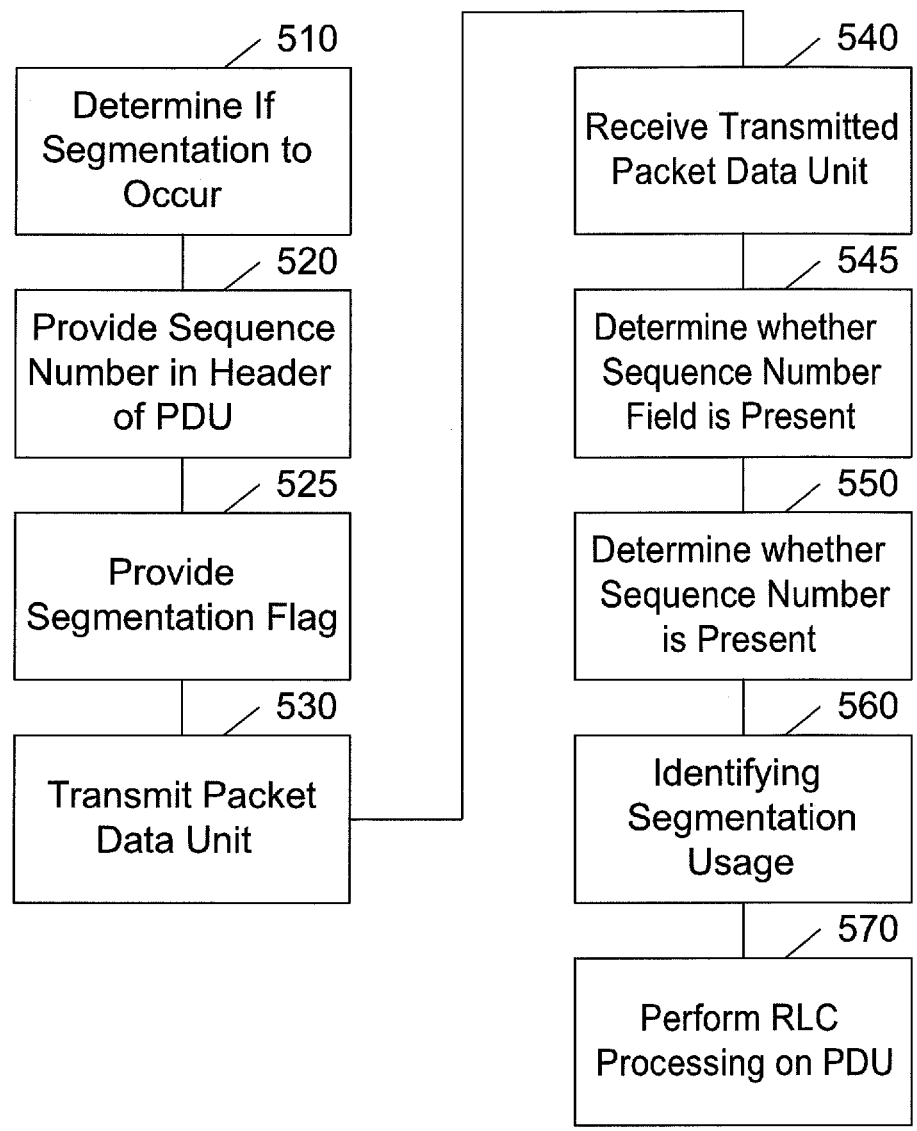
FIG. 5 illustrates a method according to certain embodiments.

FIG. 5 illustrates a method according to certain embodiments. As shown in FIG. 5, a method can include, at 510, determining whether segmentation is to occur with respect to a packet data unit. The method can also include, at 520, providing a sequence number in a header of the packet data unit contingent on usage of segmentation with respect to the packet data unit.

The packet data unit can be a radio link control packet data unit, as distinct, for example, from a packet data convergence protocol packet data unit or a medium access control packet data unit.

As described above, in one option the sequence number may be provided when the packet data unit is a first packet data unit and the sequence number may not be provided when the packet data unit is a last packet data unit. Thus, for example, the provision of the sequence number in the header may be contingent both on whether the packet is to be segmented, and also the particular order of the packet within the sequence.

The sequence number may be provided when segmentation is not used with respect to the packet data unit. In this case, the packet data unit may be treated as being the first packet data unit, with there being no last packet data unit.

In another embodiment, as mentioned above, the sequence number may be provided only when segmentation is used with respect to the packet data unit. Thus, in this case if the packet is not segmented, the sequence number may be omitted.

The sequence number used at a radio link control sublayer may be at least one of a reused packet data convergence protocol sequence number or a separate radio link control sequence number.

The method can further include, at 530, transmitting the packet data unit. For example, the packet data unit may be transmitted in unacknowledged mode.

In a variant, the method can further include, at 525, providing a segmentation flag in a header of the packet data unit indicating whether segmentation is used for the packet data unit at the radio link control sublayer and indicating that the sequence number is present.

The method can further include, at 540, receiving the transmitted packet data unit. The method can additionally include, at 550, determining whether a sequence number is present in a header of a packet data unit. This determination can be based on identifying a segmentation flag, or by any other desired way. The method can also include, at 560, identifying usage of segmentation with respect to the packet data unit contingent on the determination of whether the sequence number is present. This identification does not have to be limited to identifying whether segmentation is used, as this may have been previously determined, but can also include identify how segmentation is being used.

The method can further include, at 545, determining whether a sequence number field is present based on a segmentation flag in a header of the packet data unit.

Additionally, the method can include, at 570, performing radio link control processing of the packet data unit based on the determined segmentation usage.

Figure 6:
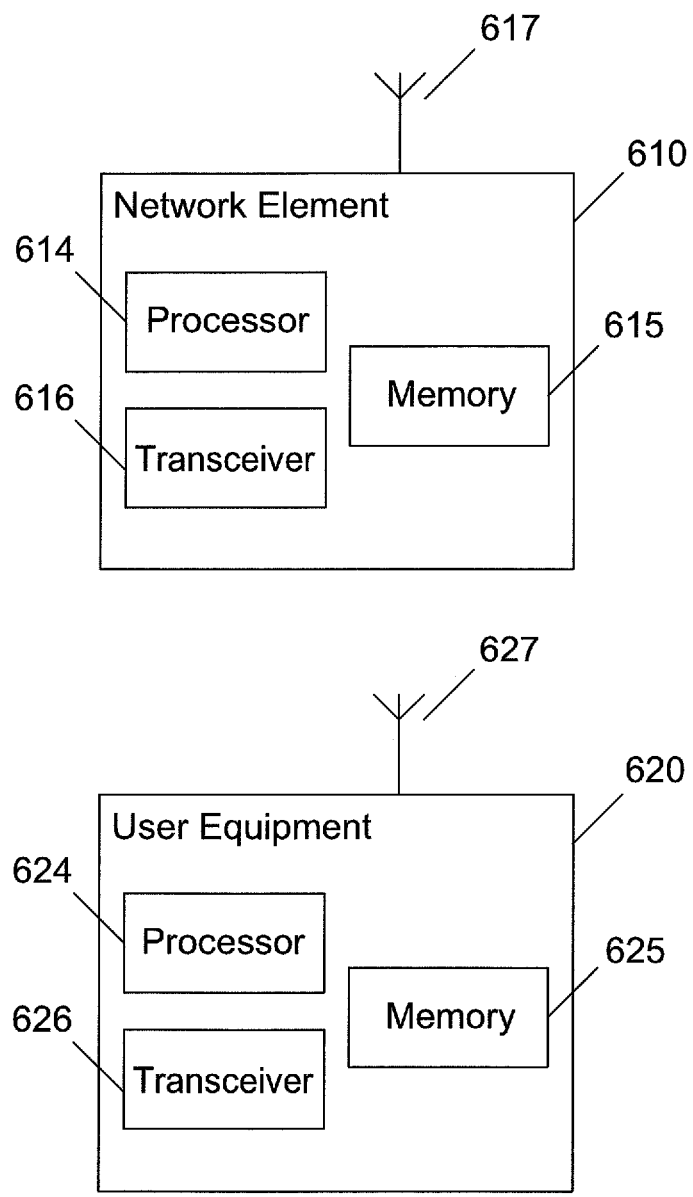
FIG. 6 illustrates a system according to certain embodiments.

FIG. 6 illustrates a system according to certain embodiments of the invention. It should be understood that each block of the flowchart of FIG. 5 or FIG. 7 may be implemented by various means or their combinations, such as hardware, software, firmware, one or more processors and/or circuitry. In one embodiment, a system may include several devices, such as, for example, network element 610 and user equipment (UE) or user device 620.

The system may include more than one UE 620 and more than one network element 610, although only one of each is shown for the purposes of illustration. A network element can be an access point, a base station, an eNode B (eNB), a next generation Node B (gNB), or any other network element. Each of these devices may include at least one processor or control unit or module, respectively indicated as 614 and 624. At least one memory may be provided in each device, and indicated as 615 and 625, respectively. The memory may include computer program instructions or computer code contained therein, for example for carrying out the embodiments described above. One or more transceiver 616 and 626 may be provided, and each device may also include an antenna, respectively illustrated as 617 and 627. Although only one antenna each is shown, many antennas and multiple antenna elements may be provided to each of the devices. Other configurations of these devices, for example, may be provided. For example, network element 610 and UE 620 may be additionally configured for wired communication, in addition to wireless communication, and in such a case antennas 617 and 627 may illustrate any form of communication hardware, without being limited to merely an antenna.

Transceivers 616 and 626 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. It should also be appreciated that according to the "liquid" or flexible radio concept, the operations and functionalities may be performed in different entities, such as nodes, hosts or servers, in a flexible manner. In other words, division of labor may vary case by case. One possible use is to make a network element to deliver local content. One or more functionalities may also be implemented as a virtual application that is provided as software that can run on a server.

A user device or user equipment 620 may be a mobile station (MS) such as a mobile phone or smart phone or multimedia device, a computer, such as a tablet, provided with wireless communication capabilities, personal data or digital assistant (PDA) provided with wireless communication capabilities, vehicle, portable media player, machine type communication device, digital camera, pocket video camera, navigation unit provided with wireless communication capabilities or any combinations thereof. The user device or user equipment 620 may be a sensor or smart meter, or other device that may usually be configured for a single location.

In an exemplifying embodiment, an apparatus, such as a node or user device, may include means for carrying out embodiments described above in relation to FIG. 5 or described below in relation to FIG. 7.

Processors 614 and 624 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors. Additionally, the processors may be implemented as a pool of processors in a local configuration, in a cloud configuration, or in a combination thereof. The term circuitry may refer to one or more electric or electronic circuits. The term processor may refer to circuitry, such as logic circuitry, that responds to and processes instructions that drive a computer.

For firmware or software, the implementation may include modules or units of at least one chip set (e.g., procedures, functions, and so on). Memories 615 and 625 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network element 610 and/or UE 620, to perform any of the processes described above (see, for example, FIG. 5 or FIG. 7). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C #, Java, etc., or a low-level programming language, such as a machine language, or assembler. Alternatively, certain embodiments of the invention may be performed entirely in hardware.

Furthermore, although FIG. 6 illustrates a system including a network element 610 and a UE 620, embodiments of the invention may be applicable to other configurations, and configurations involving additional elements, as illustrated and discussed herein. For example, multiple user equipment devices and multiple network elements may be present, or other nodes providing similar functionality, such as nodes that combine the functionality of a user equipment and an access point, such as a relay node.

Figure 7:
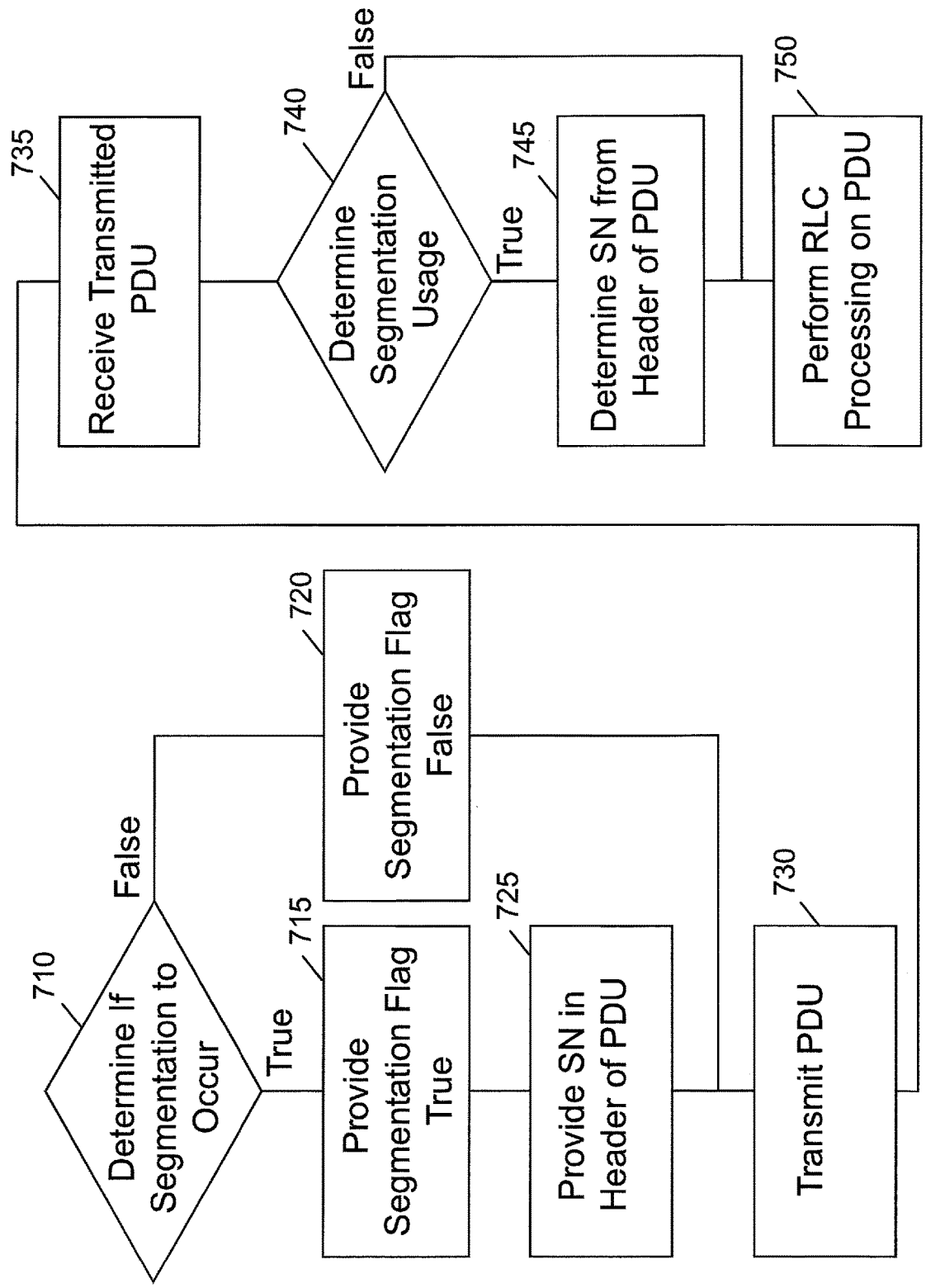
FIG. 7 illustrates a flowchart of a method according to certain embodiments.

FIG. 7 illustrates a flowchart of a method according to certain embodiments. As shown in FIG. 7, a method can include, at 710, determining if segmentation is to occur. If so, a segmentation flag can be provided at 715. Otherwise, this segmentation flag can be omitted at 720. At 725, the method can include providing a sequence number in a header of the packet data unit. The method can further include, at 730, transmitting the packet data unit.

The transmitted packet data unit can be received at 735. The receiving device can also, at 740, determine segmentation usage. As mentioned above, this can be determined from the presence or absence of a segmentation flag, or by any other desired way. If segmentation is determined, a sequence number can be determined from the header of the packet data unit. At 750, radio link control processing can be performed on a packet data unit.

Certain embodiments may have various benefits and/or advantages, as described above. Additionally, the method according to certain embodiments may be of particular benefit for real time services with low bit rates, such as voice over IP (VoIP) for which reduced overhead can be useful to increase coverage. In a typical scenario, when VoIP is used in conjunction with robust header compression (ROHC), segmentation may only occur when a full IP header needs to be sent together with a speech frame. As a result, with the method according to certain embodiments, whenever a speech frame fits without segmentation, overhead can be minimized and coverage can be improved.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

LIST OF ABBREVIATIONS

AM Acknowledged Mode
HARQ Hybrid ARQ
MAC Medium Access Control
NR New Radio
PDCP Packet Data Convergence Protocol
RLC Radio Link Control
TB Transport Block
UM Unacknowledged Mode

We claim:
1. A method, comprising:
   determining whether usage of segmentation is to occur or not occur with respect to a radio link control packet data unit; and
   based on determining whether usage of segmentation is to occur or not occur, one of:
   providing a sequence number in a header at a radio link control sublayer of the radio link control packet data unit contingent on usage of segmentation is to occur with respect to the radio link control packet data unit, or
   not providing a sequence number in the header at the radio link control sublayer of the radio link control packet data unit contingent on usage of segmentation is to not occur with respect to the radio link control packet data unit.

2. The method of claim 1, wherein the sequence number is provided only when segmentation is used with respect to the radio link control packet data unit.

3. The method of claim 1, wherein the sequence number used at the radio link control sublayer is at least one of a reused packet data convergence protocol sequence number or a separate radio link control sequence number.

4. The method of claim 1, further comprising:
providing a segmentation flag in a header of the radio link control packet data unit indicating that a segmentation is used for the radio link control packet data unit at the radio link control sublayer.

5. The method of claim 1, wherein the sequence number is provided when the radio link control packet data unit is a first radio link control packet data unit.

6. The method of claim 1, wherein:
the determining whether usage of segmentation is to occur or not occur is performed with respect to multiple radio link control packet data units; and
based on the determining whether usage of segmentation is to occur or not occur, performing the following:
the providing the sequence number comprises providing the sequence number at the radio link control sublayer of individual ones of the multiple radio link control packet data units contingent on usage of segmentation is to occur with respect to the individual ones of the multiple radio link control packet data units, and
the not providing the sequence number comprises not providing the sequence number at the radio link control sublayer of the individual ones of the multiple radio link control packet data units contingent on usage of segmentation is not to occur with respect to the individual ones of the multiple radio link control packet data units.

7. The method of claim 6, wherein one or more of the individual ones of the multiple radio link control packet data units have provided sequence numbers and one or more of the individual ones of the multiple radio link control packet data units do not have provided sequence numbers.

8. A method, comprising:
determining whether usage of segmentation is used or not used for a radio link control packet data unit; and
based on the determining, identifying whether a sequence number is used with respect to the packet data unit contingent on one of:
a sequence number being provided in a header at a radio link control sublayer of the radio link control packet data unit contingent on segmentation used with respect to the radio link control packet data unit, or
a sequence number not being provided in the header at the radio link control sublayer of the radio link control packet data unit contingent on segmentation not used with respect to the radio link control packet data unit.

9. The method of claim 8, wherein the sequence number is provided only when segmentation is used with respect to the radio link control packet data unit.

10. The method of claim 8, wherein based on a usage of the sequence number at the radio link control sublayer the sequence number is at least one of a reused packet data convergence protocol sequence number or a separate radio link control sequence number.

11. An apparatus, comprising:
at least one processor; and
at least one memory including computer program code, wherein the at least one memory and the computer program code are configured to, with the at least one processor, cause the apparatus at least to
determine whether usage of segmentation is to occur or not occur with respect to a radio link control packet data unit; and
based on determining whether usage of segmentation is to occur or not occur, one of:
provide a sequence number in a header at a radio link control sublayer of the radio link control packet data unit contingent on usage of segmentation is to occur with respect to the radio link control packet data unit, or not provide a sequence number in the header at the radio link control sublayer of the radio link control packet data unit contingent on usage of segmentation is not to occur with respect to the radio link control packet data unit.

12. The apparatus of claim 11, wherein the sequence number is provided only when segmentation is used with respect to the radio link control packet data unit.

13. The apparatus of claim 11, wherein the sequence number used at the radio link control sublayer is at least one of a reused packet data convergence protocol sequence number or a separate radio link control sequence number.

14. The apparatus of claim 11, wherein the at least one memory and the computer program code are configured to, with the at least one processor, cause the apparatus at least to transmit the radio link control packet data unit in unacknowledged mode.

15. The apparatus of claim 11, wherein the at least one memory and the computer program code are configured to, with the at least one processor, cause the apparatus at least to provide a segmentation flag in a header of the radio link control packet data unit indicating that a segmentation is used for the radio link control packet data unit at the radio link control sublayer.

16. An apparatus, comprising:
at least one processor; and
at least one memory including computer program code, wherein the at least one memory and the computer program code are configured to, with the at least one processor, cause the apparatus at least to
determine whether segmentation is used or not used for a radio link control packet data unit; and
based on determining whether segmentation is used or not used, identify whether a sequence number is used with respect to the packet data unit contingent on one of:
a sequence number being provided in a header at a radio link control sublayer of the radio link control packet data unit contingent on the determination that segmentation is used, or
a sequence number not being provided in the header at the radio link control sublayer of the radio link control packet data unit contingent on the determination that segmentation is not to occur with respect to the radio link control packet data unit.

17. The apparatus of claim 16, wherein the sequence number used at a radio link control sublayer is at least one of a reused packet data convergence protocol sequence number or a separate radio link control sequence number.

18. The apparatus of claim 16, wherein the at least one memory and the computer program code are configured to, with the at least one processor, cause the apparatus at least to receive the radio link control packet data unit in unacknowledged mode.

19. The apparatus of claim 16, wherein the at least one memory and the computer program code are configured to, with the at least one processor, cause the apparatus at least to determine that the segmentation is used for the radio link control packet data unit is based on a segmentation flag in a header of the radio link control packet data unit.

* * * * *